(12) United States Patent
Panda et al.

(10) Patent No.: US 10,055,467 B1
(45) Date of Patent: Aug. 21, 2018

(54) RANKING SEARCH RESULTS

(71) Applicant: Google LLC, Mountain View, CA (US)

(72) Inventors: Navneet Panda, Mountain View, CA (US); Vladimir Ofitserov, Foster City, CA (US); Kaihua Zhu, Santa Clara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/608,083

(22) Filed: May 30, 2017

Related U.S. Application Data

(62) Division of application No. 13/731,794, filed on Dec. 31, 2012, now Pat. No. 9,684,697.

(60) Provisional application No. 61/583,596, filed on Jan. 5, 2012.

(51) Int. Cl.
*G06F 17/30* (2006.01)
*G06F 7/00* (2006.01)

(52) U.S. Cl.
CPC .............................. *G06F 17/30554* (2013.01)

(58) Field of Classification Search
USPC ........................................................ 707/727
See application file for complete search history.

(56) References Cited

U.S. PATENT DOCUMENTS

| | | | |
|---|---|---|---|
| 6,701,309 B1 | 3/2004 | Beeferman et al. | |
| 7,603,350 B1 | 10/2009 | Guha | |
| 7,797,344 B2 | 9/2010 | Kaul et al. | |
| 7,836,050 B2 | 11/2010 | Jing et al. | |
| 8,209,380 B2 | 6/2012 | Tiu, Jr. et al. | |
| 8,442,984 B1 | 5/2013 | Pennock et al. | |
| 8,612,424 B2 | 12/2013 | Dasdan et al. | |
| 8,818,838 B1 | 8/2014 | Sharma et al. | |
| 2005/0278321 A1* | 12/2005 | Vailaya | G06F 17/30864 |
| 2006/0147094 A1* | 7/2006 | Yoo | G06K 9/00604 |
| | | | 382/117 |
| 2011/0010367 A1* | 1/2011 | Jockish | G06F 17/30675 |
| | | | 707/733 |
| 2011/0261049 A1* | 10/2011 | Cardno | G06Q 10/10 |
| | | | 345/419 |

(Continued)

OTHER PUBLICATIONS

AheadWorks Magento World Advanced Reports Unit: New vs. Returning Customers Date unknown [but captured by Archive.org on Nov. 21, 2010, www.aheadworks.com/, https://web.archive.org/web/20101121095934/http://ecommerce.aheadworks.com/magento-extensions/advanced-reportsunits/new-vs-returning-customers.html.

(Continued)

*Primary Examiner* — Kuen S Lu
(74) *Attorney, Agent, or Firm* — Fish & Richardson P.C.

(57) ABSTRACT

Methods, systems, and apparatus, including computer programs encoded on computer storage media, for receiving a search query from a client device; receiving search result data identifying a first plurality of search result resources and respective initial scores for each of the first plurality of search result resources; identifying a respective group of resources to which each of the search result resources belongs; determining a respective group-based modification factor for each group of resources; and adjusting the initial score for each of the search result resources based at least in part on the group-specific modification factor for the group of resources to which the search result resource belongs to generate a respective second score for each of the search result resources.

15 Claims, 6 Drawing Sheets

(56) References Cited

U.S. PATENT DOCUMENTS

| | | |
|---|---|---|
| 2013/0015923 A1 | 1/2013 | McKinley et al. |
| 2013/0110648 A1 | 5/2013 | Raab |
| 2014/0149399 A1 | 5/2014 | Kurzion |
| 2014/0261049 A1* | 9/2014 | Knapp ...................... B61J 1/04 104/35 |

OTHER PUBLICATIONS

User session, webopedia.com, http://www.webopedia.com/TERM/U/user_session.html.

Habinson & Steele, C: A Reference Manual 1995, Prentice-Hall, 4th ed. pp. 238-239.

Patterson & Hennessy, Computer Organization & Design: The Hardware/Software Interface 1998, Morgan Kaufmann Publishers, 2nd ed., p. A-62.

* cited by examiner

RANKING SEARCH RESULTS

CROSS-REFERENCE TO RELATED APPLICATION

This application is a divisional of U.S. application Ser. No. 13/731,794, entitled "Ranking Search Results," filed Dec. 31, 2012, which claims the benefit under 35 U.S.C. § 119(e) of U.S. Patent Application No. 61/583,596, entitled "Ranking Search Results," filed Jan. 5, 2012, which is incorporated by reference herein in its entirety.

BACKGROUND

This specification relates to ranking search results for search queries submitted to an Internet search engine.

Internet search engines aim to identify resources (e.g., web pages, images, text documents, multimedia content) that are relevant to a user's needs and to present information about the resources in a manner that is most useful to the user. Internet search engines return a set of search results in response to a user submitted query.

SUMMARY

In general, one innovative aspect of the subject matter described in this specification can be embodied in methods that include the actions of receiving a search query from a client device; receiving data identifying a plurality of search result resources and respective initial scores for each of the search result resources; identifying a respective group of resources to which each of the search result resources belongs; determining a respective group-based modification factor for each group of resources; and adjusting the initial score for each of the search result resources based at least in part on the group-specific modification factor for the group of resources to which the search result resource belongs to generate a respective second score for each of the search result resources. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments can each optionally include one or more of the following features. The method can further include: providing search results to the client device, each search result identifying a respective search result resource, for presentation in an order according to the second scores of the search result resources identified by the search results. The method can further include: making further adjustments to the second scores before providing the search results to the client device. Identifying the group of resources to which each of the search result resources belongs can include: identifying the group of resources based on an Internet address of the search result resource.

Adjusting the initial score for each of the search result resources based at least in part on the group-specific modification factor for the group of resources to which the search result resource belongs can include: generating a respective resource-specific modification factor for each of the search result resources based on the group-based modification factors. Adjusting the initial score for each of the search result resources based at least in part on the group-specific modification factor for the group of resources to which the search result resource belongs further can include: multiplying the initial score for the search result resource by the resource-specific modification factor for the search result resource.

Generating a respective resource-specific modification factor for a first search result resource can include: determining that the search query is navigational to the first search result resource; and generating the resource-specific modification factor for the first search result resource so that the resource-specific modification factor does not modify the initial score for the first search result resource when applied to the initial score. Generating a respective resource-specific modification factor for a first search result resource can include: determining that the search query is not navigational to the first search result resource. Generating a respective resource-specific modification factor for the first search result resource can further include: determining that the initial score for the search result resource does not exceed a first threshold value; and generating the resource-specific modification factor for the first search result resource so that the resource-specific modification factor does not modify the initial score for the first search result resource when applied to the initial score.

Generating a respective resource-specific modification factor for a second search result resource can include: determining that the initial score for the second search result resource exceeds the first threshold value but does not exceed a second, higher threshold value; and generating the resource-specific modification factor for the second search result resource, wherein the resource-specific modification factor ($f_1$) for the second search result resource is equal to:

$$f_1 = \frac{T_1 + (IS - T_1) \cdot M}{IS},$$

wherein $T_1$ is the first threshold value, IS is the initial score for the second search result resource, and M is the group-based modification factor for the group of resources to which the second search result resource belongs.

Generating a respective resource-specific modification factor for a third search result resource can include: determining that the initial score for the third search result resource exceeds the second threshold value; and generating the resource-specific modification factor for the third search result resource, wherein the resource-specific modification factor ($f_2$) for the third search result resource is equal to:

$$f_2 = \frac{f_3}{\log_{T_2}(IS) \cdot g(f_3)},$$

wherein $T_2$ is the second threshold value, $f_3$ is an initial resource-specific modification factor for the third search result resource and $g(f_3)$ is a smoothing function that reduces the effect of the resource-specific modification factor for the third search result resource on the initial score for the third search result resource for particular ranges of values of the initial resource-specific modification factor.

The initial resource-specific modification factor ($f_3$) for the third search result resource can be equal to:

$$f_3 = \frac{T_1(IS - T_1) \cdot M}{IS},$$

wherein $T_1$ is the first threshold value, IS is the initial score for the third search result resource, and M is the group-based modification factor for the group of resources to which the third search result resource belongs.

The smoothing function can be defined as:

$g(f_3)=1$, if $f_3 \leq Q$ and $$g(f_3) = \frac{(1 - f_3)}{1 - P},$$

if $f_3 > Q$,
wherein Q is a predetermined threshold value.

Determining a group-based modification factor for a particular group of resources can include: determining a count of unique clicks on the particular group of resources; determining a count of repeat clicks on the particular group of resources; generating a repeat click fraction for the particular group of resources based on the count of unique clicks and the count of repeat clicks; and using the repeat click fraction to determine the group-based modification factor for the particular group of resources.

A unique click on the particular group of resources can be a click by a unique user on a search result that identifies a resource in the particular group of resources. A unique user can be a user who has not previously clicked on any search results identifying any resource in the particular group.

The method can further include: identifying a first click by a particular user on a first search result during a first search session, wherein the first search result is provided to the particular user in response to a first search query, and wherein the first search result identifies a particular resource in the particular group of resources; identifying a second click by the particular user on a second search result during a different, second search session, wherein the second search result is provided to the particular user in response to a second search query, wherein text of the first search query matches text of the second search query, and wherein the second search result identifies the particular resource; and counting the second click by the particular user as a repeat click on the particular group of resources. The method can further include: identifying a third click by the particular user on a third search result during a different, third search session, wherein the third search result is provided to the particular user in response to a third search query, wherein text of the first search query matches text of the third search query, and wherein the third search result identifies the particular resource; determining that the second click by the particular user has been counted as a repeat click on the particular group of resources; and refraining from counting the third click by the particular user as a repeat click on the particular group of resources. The time between the first click and the second click can exceed a predetermined threshold time.

The repeat click fraction (RCF) can be expressed as:

$$RCF = \frac{RC}{UC},$$

wherein RC is the number of repeat clicks counted for the particular group of resources and UC is the number of unique clicks counted for the particular group of resources.

Using the repeat click fraction to compute the group-based modification factor for the particular group of resources can include computing a repeat click fraction-based modification factor ($M_{RCF}$) for the particular group of resources, and wherein $M_{RCF}$ is expressed as:

$M_{RCF} = S_{RCF}(RCF)$, wherein $S_{RCF}(RCF)$ is a sigmoid function that takes as an input the repeat click fraction (RCF) for the particular group of resources.

The method can further include: obtaining a count of deliberate visits to the particular group of resources; obtaining a count of search result visits to the particular group of resources; generating a deliberate visit fraction for the particular group of resources; and using the deliberate visit fraction to generate the group-based modification factor for the particular group of resources. A deliberate visit to the particular group of resources can occur when a user directly accesses a resource in the particular group of resources. A search result visit to the particular group of resources can occur when a user initiates a request for a resource in the particular group of resources by clicking on a search result that identifies the resource.

The deliberate visit fraction for the particular group of resources can be expressed as:

$$DVF = \frac{DV}{SRV},$$

where DV is the number of deliberate visits counted for the particular group and SRV is the number of search result visits counted for the particular group.

Using the deliberate visit fraction to generate the group-based modification factor for the particular group of resources can include adjusting the $M_{RCF}$ for the particular group of resources based on the DVF to generate a repeat click fraction and deliberate visit fraction-based modification factor for the particular group ($M_{RCF,DVF}$). $M_{RCF,DVF}$ can be expressed as:

$$M_{RCF,DVF} = \frac{S_{RCF}(RCF) + S_{DVF}(DVF)}{2},$$

where $S_{DVF}$ is a sigmoid function that takes as an input the deliberate visit fraction for the group of resources.

$M_{RCF,DVF}$ can be expressed as:

$M_{RCF,DVF} = \min(w \cdot S_{RCF}(RCF) + (1-w) \cdot S_{DVF}(DVF), 1)$, where $S_{DVF}$ is a sigmoid function that takes as an input the deliberate visit fraction for the group of resources, and where w is a constant value.

$M_{RCF,DVF}$ can be expressed as:

$M_{RCF,DVF} = \min(w \cdot S_{RCF}(RCF) + (1-w) \cdot S_{DVF}(DVF) + w \cdot S_{RCF}^1(RCF), 1)$, where $S_{DVF}$ is a sigmoid function that takes as an input the deliberate visit fraction for the group of resources, where w is a constant value, and where $S^1_{RCF}(RCF)$ is a second sigmoid function that takes as input the RCF of the particular group and is defined so that:

$w \cdot S_{RCF}(RCF) + (1-w) \cdot S_{DVF}(DVF) + w \cdot S_{RCF}^1(RCF) \geq 1$ if $RCF \geq T$, where T is a predetermined threshold value.

The method can further include: obtaining a value of an average duration metric for the particular group of resources; obtaining a value of a group-specific query metric for the particular group of resources; using the value of the average duration metric and the value of the group-specific query metric to determine the group-based modification factor for the particular group of resources.

The average duration metric for the particular group of resources can be a statistical measure computed from a data set of measurements of a length of time that elapses between a time that a given user clicks on a search result included in a search results web page that identifies a resource in the particular group of resources and a time that the given user navigates back to the search results web page.

The group-specific query metric for the particular group of resources can be based in part on a number of queries that reference the particular group of resources that have been submitted to a search engine. The group-specific query metric (GS) for the particular group of resources can be expressed as:

$$GS = \frac{\max(s-a, 0) \cdot b}{q^c},$$

where s is the number of queries that reference a resource in the particular group of resources, q is a number of unique queries for which a search result identifying any resource in the particular group of resources received a click, and a, b, and c are suitable constants.

Using the value of the average duration metric (AD) and the value of the group-specific query metric (GS) to determine the group-based modification factor for the particular group of resources can include adjusting the $M_{RCF,DVF}$ to generate the group-based modification factor (M) for the particular group. M can be expressed as:

$$M = M_{RCF,DVF} + S_{AD,GS}(AD, GS),$$

wherein $S_{AD,GS}(AD, GS)$ is a surface sigmoid function that takes as input the values of the average duration metric and group-specific query metric.

The subject matter described in this specification can be implemented in particular embodiments so as to realize one or more of the following advantages. Search results identifying low-quality resources can be demoted in a presentation order of search results returned in response to a user's query. Thus, the user experience can be improved because search results higher in the presentation order will better match the user's informational needs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
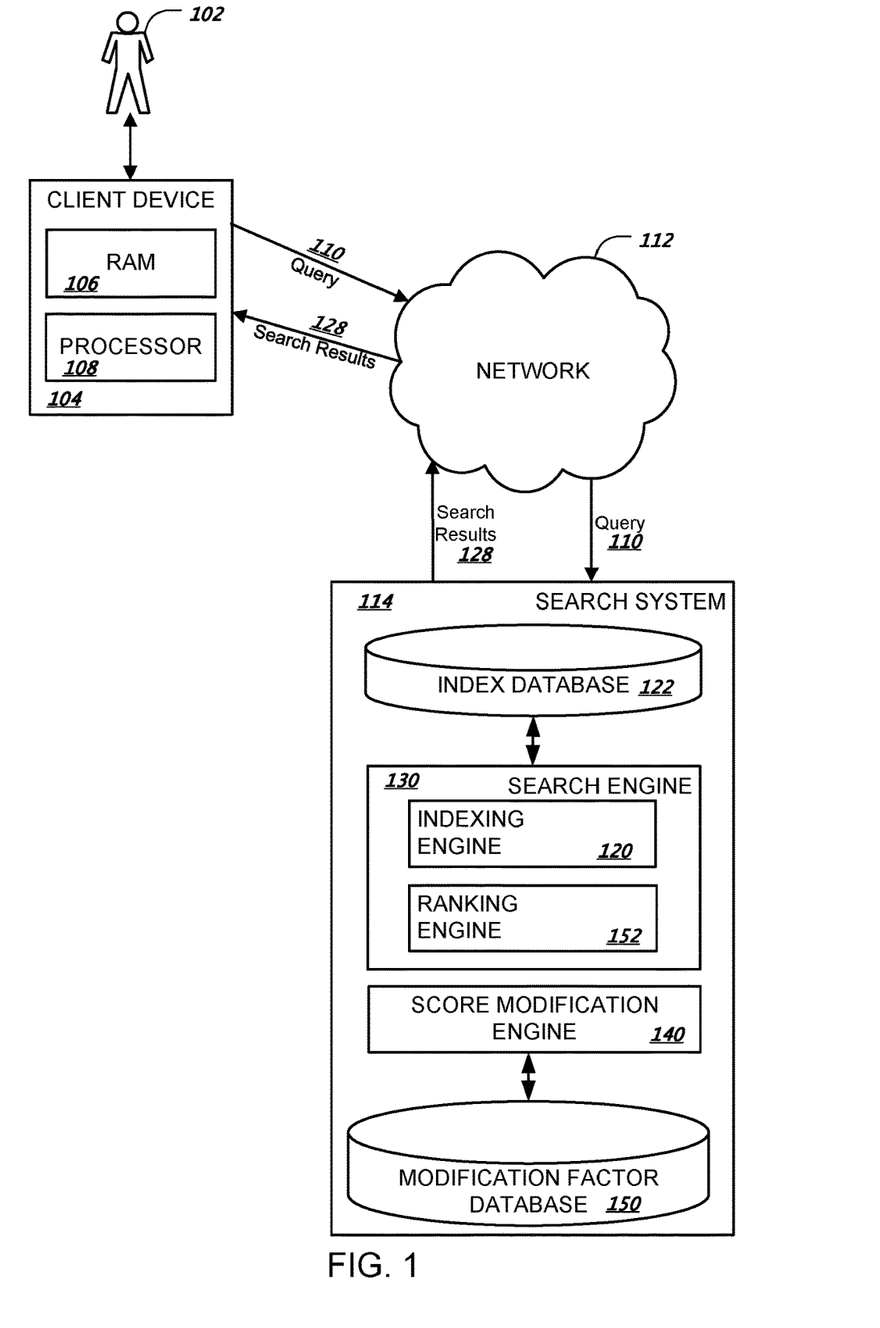
FIG. 1 shows an example search system.

FIG. 1 shows an example search system 114. The search system 114 is an example of an information retrieval system implemented as computer programs on one or more computers in one or more locations, in which the systems, components, and techniques described below can be implemented.

A user 102 can interact with the search system 114 through a client device 104. For example, the client device 104 can be a computer coupled to the search system 114 through a data communication network 112, e.g., local area network (LAN) or wide area network (WAN), e.g., the Internet, or a combination of networks. In some cases, the search system 114 can be implemented on the client device 104, for example, if a user installs an application that performs searches on the client device 104. The client device 104 will generally include a memory, e.g., a random access memory (RAM) 106, for storing instructions and data and a processor 108 for executing stored instructions. The memory can include both read only and writable memory.

A user 102 can use the client device 104 to submit a query 110 to a search system 114. A search engine 130 within the search system 114 performs a search to identify resources matching the query. When the user 102 submits a query 110, the query 110 may be transmitted through the network 112 to the search system 114. The search system 114 includes an index database 122 and the search engine 130. The search system 114 responds to the query 110 by generating search results 128, which are transmitted through the network to the client device 104 for presentation to the user 102, e.g., as a search results web page to be displayed by a web browser running on the client device 104.

In this specification, the term "database" will be used broadly to refer to any collection of data: the data does not need to be structured in any particular way, or structured at all, and it can be stored on storage devices in one or more locations. Thus, for example, the index database 122 can include multiple collections of data, each of which may be organized and accessed differently. Similarly, in this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

When the query 110 is received by the search engine 130, the search engine 130 identifies resources that satisfy the query 110. The search engine 130 will generally include an indexing engine 120 that indexes resources, an index database 122 that stores the index information, and a ranking engine 152 or other software that generates scores for the resources that satisfy the query 110 and that ranks the resources according to their respective scores.

The search system 114 also includes or can communicate with a score modification engine 140 that generates modification factors that are applied to initial scores generated by the search engine 130 for resources that match the query 110. The score modification engine 140 can generate the scores based at least in part on modification data that associates a respective modification factor with each of a number of multiple groups of resources. The modification data is stored in a repository accessible to the system, e.g., modification factor database 150.

A group of resources is a portion of the resources on the Internet. A group can be defined in any of a variety of ways. An address-based group of resources is a group of resources that is defined by the Internet addresses, e.g., Uniform Resource Locators (URLs), of the resources in the group. For example, a group of resources can include each resource that can be accessed using a particular domain name. That is, the group could include http://www.domain.com/resource1, http://wwww.domain.com/resource2, http://www.domain.com/resourceN, and so on, without regard to when the resources first become available to the search engine 130 for indexing. Alternatively, a group of resources can include each resource that can be accessed using a particular host name, e.g., http://host.example.com/resource1, http://host.example.com/resource2, http://host.example.com/resourceN, and so on. Other address-based groupings are possible. For example, a particular group can include only a portion of the resources that can be accessed using a particular host name or a particular domain name. Alternatively, a particular group may include resources that can be accessed using one domain name and other resources that can be accessed using another domain name. Generating a modification factor for a group of resources, and in particular for an address-based group of resources, will be described below with reference to FIGS. 3-5.

Figure 2:
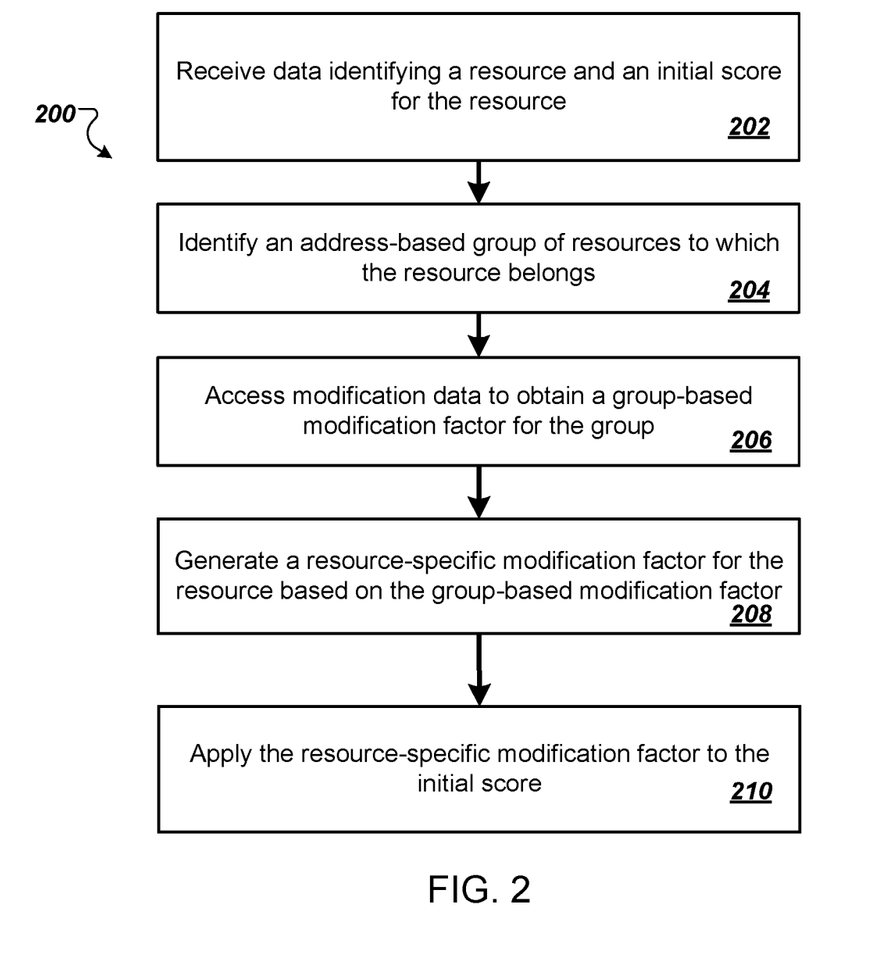
FIG. 2 is a flow diagram of an example process for adjusting an initial score for a resource identified by search results for a received search query.

FIG. 2 is a flow diagram of an example process 200 for adjusting an initial score for a resource identified by search results for a received search query. For convenience, the process 200 will be described as being performed by a system of one or more computers located in one or more locations. For example, a search system, e.g., search system 114 of FIG. 1, can be used to perform the process 200.

The system receives data identifying a resource, e.g., a resource identifier of some kind, and an initial score for the resource (step 202). The initial score is generated for the resource as a response to a received search query. For example, the initial score can be, e.g., a measure of the relevance of the resource to the search query, a measure of the quality of the resource, or both.

The system identifies an address-based group of resources to which the resource belongs (step 204). The system can identify the group of resources to which the resource belongs based on the URL by which the resource is accessed. For example, the group can be resources that share the same domain name or resources that share the same host name.

The system accesses modification data to obtain a group-based modification factor for the group of resources to which the resource belongs (step 206). The modification data is stored in a repository of modification data, e.g., modification factor database 150 of FIG. 1. The modification data can include data that associates a respective modification factor with each of a number of groups. Generating a respective modification factor for each of a number of groups of resources will be described below with reference to FIGS. 3-5.

The system generates a resource-specific modification factor for the resource based on the group-based modification factor (step 208). Generally, the system can adjust the group-based modification factor based one or more query-specific factors to generate the resource-specific modification factor for the resource. Generating a resource-specific modification factor based on a group-based modification factor will be described in more detail below with reference to FIG. 6.

The system applies the resource-specific modification factor to the initial score for the resource (step 210). For example, the resource-specific modification factor can be a multiplicative factor applied to the initial score to generate a modified score for the resource. The search results generated in response to the search query can then be ranked according to modified scores for the respective resources identified by the search results. Alternatively, the modified scores can be further adjusted before the search results are ranked and transmitted to a client device for presentation.

Figure 3:
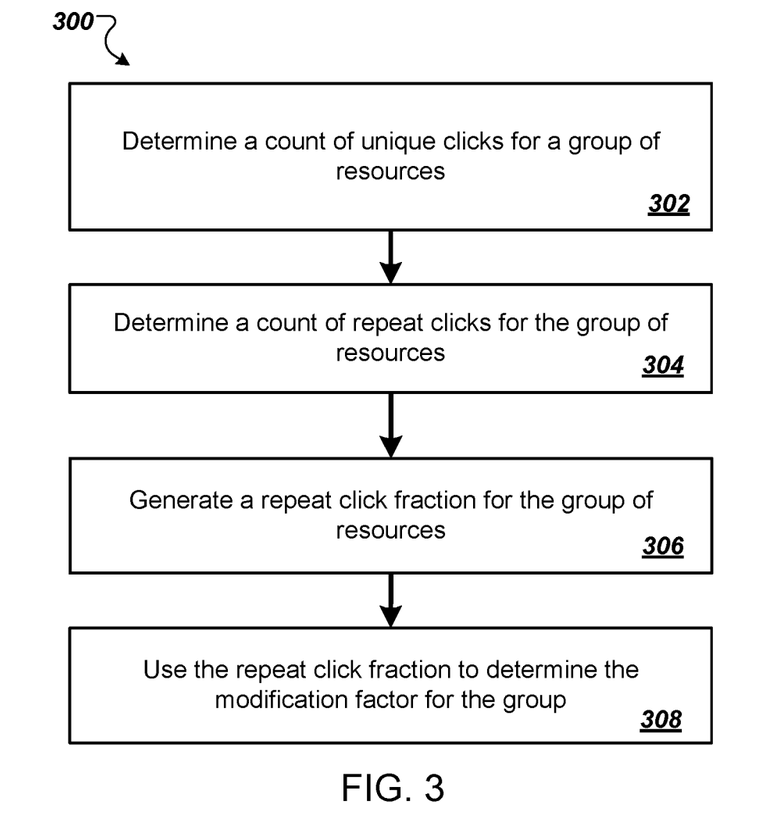
FIG. 3 is a flow diagram of an example process for determining a modification factor for a group of resources using repeat clicks for the group.

FIG. 3 is a flow diagram of an example process 300 for determining a modification factor for a group of resources. For convenience, the process 300 will be described as being performed by a system of one or more computers located in one or more locations. For example, a search system, e.g., search system 114 of FIG. 1, can be used to perform the process 300.

The process 300 is performed for each of a number of groups of resources.

The system determines, e.g., from a record of click data, a count of unique clicks on search results identifying resources in the group (step 302). The clicks are made by users on search results provided to the users by the system. The system can count unique clicks in a number of ways. For example, the system can count, as a unique click on a group of resources, a click by a unique user on a search result that identifies a resource in the group of resources. The system can use any of a variety of criteria to determine when a click occurs. For example, the system can treat as a click any user action made with respect to a search result that initiates a request for the resource identified by the search result, e.g., a cursor click on a URL of a resource in the search result in a graphical user interface of a web browser. Optionally, the system can further require that the user's viewing of the resource be for a minimum threshold length of time, which threshold can optionally depend on the type of the resource, the length of the resource, measured in time for a media resource or words for a text resource, or both.

Although the selection of a search result is referred to by this specification as a "click," the selection can also be a voice-based selection, or a selection by a user's finger on a presence-sensitive input mechanism, e.g., a touch-screen device, or any other appropriate selection mechanism.

A click on a search result that identifies a resource in a group is counted as a unique click on the group only if the user making the click has not previously clicked on any search result identifying any resource in the group.

The system can determine whether a user is unique, i.e., whether the user has previously selected a search result identifying a resource in the group of resources, using conventional techniques, e.g., based on an identifier of a cookie or a login identifier. That is, for example, only one click for each cookie identifier is counted as a unique click on a group of resources. The count of unique clicks can be determined over a specified time period or, alternatively, each unique click recorded in the data available to the system can be included in the count of unique clicks.

The system determines, e.g., from the record of click data, a count of repeat clicks on the group of resources (step 304). The system can determine which clicks made by users on search results provided to the users by the system count as repeat clicks in a number of ways. For example, a user can submit a search query and click on one or more of the search results provided to the user in response to the search query. The user may later submit the same search query during a different search session and click on a search result that identifies the same resource as one of those identified by the search results the user previously clicked on. The system can count the later click on that resource as a repeat click on the group of resources to which that resource belongs. Conversely, a click by the user on a search result that identifies a resource that is not the same as any of the resources identified by search results previously clicked on by the user is not counted as a repeat click. Thus, the system can count a click by a user on a search result that identifies a resource and is provided to the user in response to a search query as a repeat click only if the same user has previously clicked on a search result identifying the same resource after submitting the same query during a previous search session. The click is counted as a repeat click on the group of resources to which the resource belongs. Two queries are considered to be the same if the text of the two queries, as submitted by the user and without modification by the search engine, matches.

The system can use any of a variety of criteria for determining whether two clicks occurred during different search sessions. For example, the system can count two clicks as occurring during different search sessions if the time between the two clicks exceeds a predetermined threshold time.

Additionally, the system counts only one click from any given user as a repeat click on a group of resources, e.g., if the same user has submitted multiple clicks that would be considered repeat clicks for the group of resources, only one of those clicks is used in the count of repeat clicks on the group of resources.

As with unique clicks, the count of repeat clicks can be determined over a specified time period or each repeat click recorded in the data available to the system can be included in the count of repeat clicks.

The system generates a repeat click fraction for the group of resources (step 306). For example, the repeat click fraction (RCF) can be expressed as:

$$RCF = \frac{RC}{UC},$$

where RC is the number of repeat clicks counted for the group of resources and UC is the number of unique clicks counted for the group of resources.

The system uses the repeat click fraction to determine the modification factor for the group (step 308). For example, the modification factor computed based on the repeat click fraction ($M_{RCF}$) can be expressed as:

$M_{RCF}=S_{RCF}(RCF),$ where $S_{RCF}(RCF)$ is a sigmoid function that takes as an input the RCF for the group of resources, which will be a value between 0 and 1, inclusive. The sigmoid function can output a value between a base value and 1.0, inclusive. The base value is the greatest reduction in initial score that the system will apply based on the RCF. The base value can be, e.g., a value greater than zero and less than or equal to 0.50, e.g., 0.05, 0.1, 0.2, 0.3, 0.4, or 0.5, and can be determined heuristically, e.g., based on possible ranges of values of the initial scores to which the modification factor is to be applied. For example, if the base value is 0.1, the system will reduce the initial score to no less than 10% of its previous value. In these and other cases, the use of a sigmoid function is described. However, other functions mapping input values to a limited range of values, e.g., the range between the base value and 1.0, inclusive, can be used.

However, in some implementations, the system considers factors in addition to the repeat click fraction when determining modification factors for groups of resources.

Figure 4:
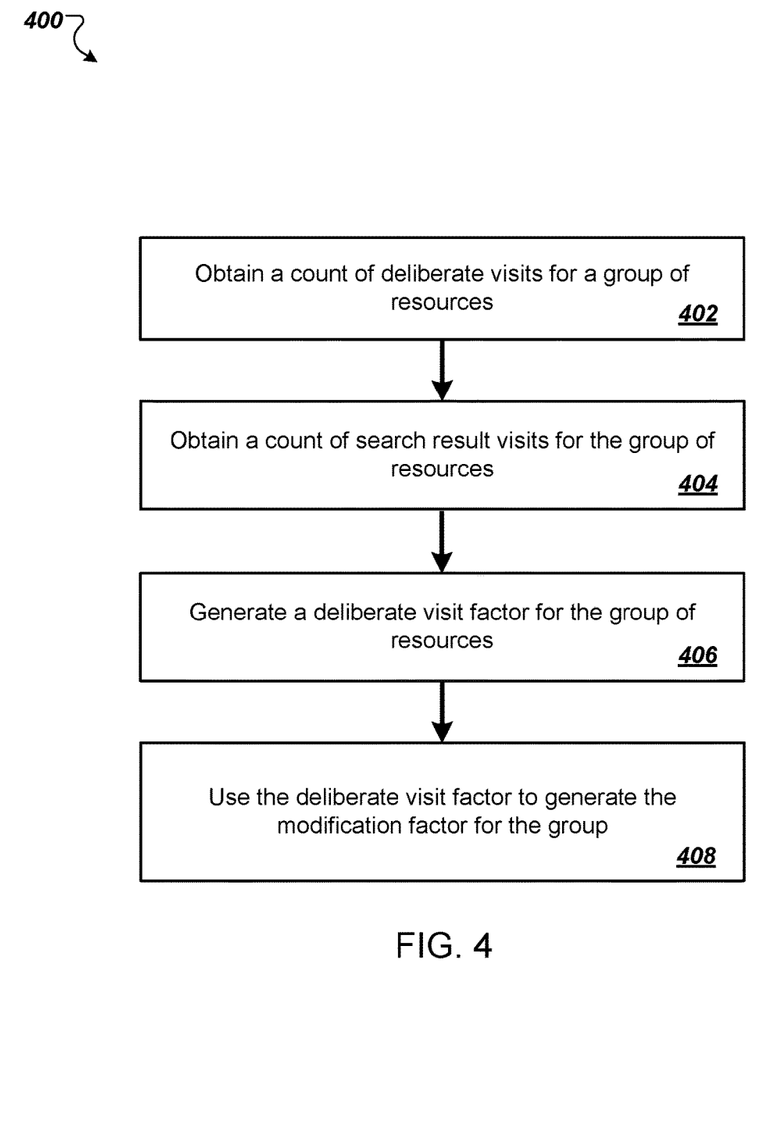
FIG. 4 is a flow diagram of an example process for determining a modification factor for a group of resources using deliberate visits for the group.

FIG. 4 is a flow diagram of an example process 400 for determining a modification factor for each of a group of resources. For convenience, the process 400 will be described as being performed by a system of one or more computers located in one or more locations. For example, a search system, e.g., search system 114 of FIG. 1, can be used to perform the process 400.

The process 400 is performed for each of a number of groups of resources.

The system obtains a count of the number of deliberate visits to a group of resources (step 402). A deliberate visit occurs when a user directly accesses a resource in the group of resources, e.g., without clicking on a link to the resource included in a separate resource. Examples of requests for a resource that can be considered deliberate visits are requests that are initiated by a user directly inputting the resource locator of the resource, e.g., into an address bar of a web browser, and requests that are initiated by a user selecting a saved reference to the resource, e.g., a bookmark that leads to the resource.

The system obtains a count of the number of search result visits to the group of resources (step 404). A search result visit occurs when a user initiates a request for a resource in the group of resources by clicking on a search result that identifies the resource.

The system generates a deliberate visit fraction for the group of resources (step 406). For example, the deliberate visit fraction (DVF) can be expressed as:

$$DVF = \frac{DV}{SRV},$$

where DV is the number of deliberate visits counted for the group and SRV is the number of search result visits counted for the group.

The system uses the deliberate visit fraction to generate the modification factor for the group (step 408). In generating the modification factor, the system can combine the sigmoid function for the repeat click fraction for the group with a sigmoid function for the deliberate visit fraction. For example, the modification factor computed based on the repeat click fraction for the group and the deliberate visit function for the group ($M_{RCF,DVF}$) can be expressed as $$M_{RCF,DVF} = \frac{S_{RCF}(RCF) + S_{DVF}(DVF)}{2},$$

where $S_{DVF}$ is a sigmoid function that takes as an input the deliberate visit fraction for the group of resources, which will be a value between 0 and infinity. The sigmoid function $S_{DVF}$ outputs a value between a base value and 1, inclusive. The base value is the greatest reduction in initial score that the system will apply based on the DVF. The base value can be, e.g., a value greater than zero and less than or equal to 0.50, e.g., 0.05, 0.1, 0.2, 0.3, 0.4, or 0.5, and can be determined heuristically, e.g., based on possible ranges of values of the initial scores to which the modification factor is to be applied, on possible ranges of $S_{RCF}$(RCF), or both. The base value for $S_{DVF}$ can be the same value as or a different value from the base value for $S_{RCF}$.

Other ways of combining the values of $S_{DVF}$ and $S_{RCF}$ to generate the modification factor for the group are possible. For example, the two terms may be added together and then multiplied by a different fraction, e.g., one third or one fourth, or the two terms may be multiplied together to generate the modification factor for the group.

In some situations, it may be desirable for the value of one term to have more influence on the modification factor than the value of the other term. For example, the repeat click fraction may be determined to be a better indicator of the quality of a group of resources than the deliberate visit fraction. Alternatively, the deliberate visit fraction may be determined to be a better indicator of the quality of a group of resources than the repeat click fraction. In view of the existence of such situations, the computation of the modification factor can be adjusted so that the sigmoid function for the repeat click fraction ($S_{RCF}$(RCF)) is weighted differently than the sigmoid function for the deliberate visit fraction.

Where this modification is implemented, the modification factor can be defined as:

$$M_{RCF,DVF} = \min(w \cdot S_{RCF}(RCF) + (1-w) \cdot S_{DVF}(DVF), 1),$$

where w is a value between 0 and 1, inclusive, and is the weight assigned to the sigmoid function for the repeat click fraction. In a situation where it is desirable for the value of $S_{RCF}$(RCF) to have more influence on the modification factor than the value of $S_{DVF}$(DVF), the value of w can be a value between 0.5 and 1. Alternatively, where it is desirable for the value of $S_{DVF}$(DVF) to have more influence on the modification factor, the value of w can be a value between 0 and 0.5.

Additionally, instead of or in addition to assigning a weight to the sigmoid functions, it may be desirable to ensure that groups of resources whose repeat click fraction exceeds a predetermined threshold value do not have their initial scores modified. This can be accomplished, for example, when the modification factor is expressed as:

$$M_{RCF,DVF} = \min(w \cdot S_{RCF}(RCF) + (1-w) \cdot S_{DVF}(DVF) + w \cdot S_{RCF}^1(RCF), 1),$$

where w is the weight and $S^1_{RCF}$(RCF) is a second sigmoid function that takes as input the RCF of the group of resources and is defined such that, for an assigned weight w:

$$w \cdot S_{RCF}(RCF) + (1-w) \cdot S_{DVF}(DVF) + w \cdot S_{RCF}^1(RCF) \geq 1 \text{ if } RCF \geq T,$$

where T is a predetermined threshold value.

Optionally, additional terms can be added in calculating the modification factor in order to protect some groups of resources from excessive modification. One example of the use of optional additional terms is described below with reference to FIG. 5. Other uses of optional terms are possible.

Figure 5:
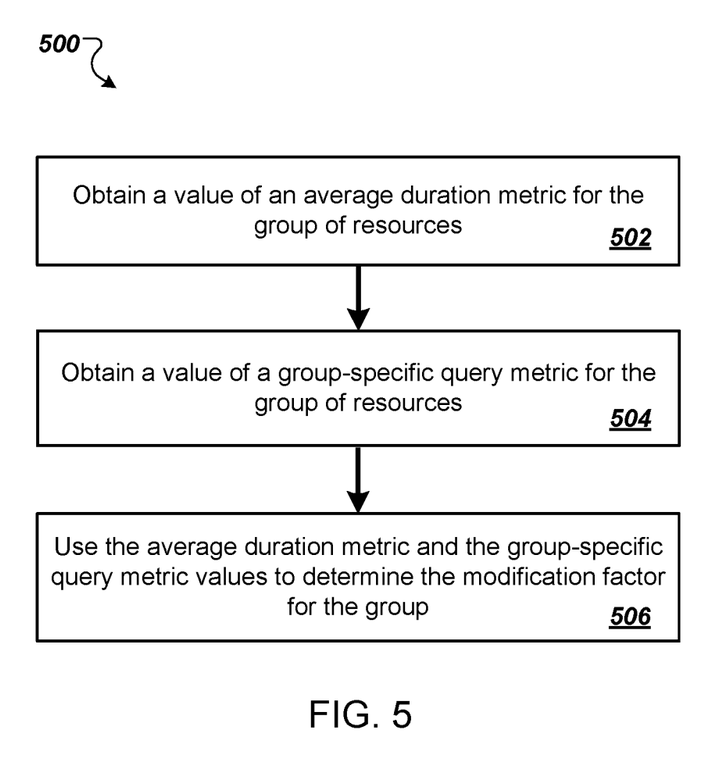
FIG. 5 is a flow diagram of an example process for determining a modification factor for a group of resources using an average duration metric for the group.

FIG. 5 is a flow diagram of an example process 500 for determining a modification factor for a group of resources. For convenience, the process 500 will be described as being performed by a system of one or more computers located in one or more locations. For example, a search system, e.g., search system 114 of FIG. 1, can be used to perform the process 500.

The process 500 is performed for each of a number of groups of resources.

The system obtains a value of an average duration metric for the group of resources (step 502). Generally, the average duration metric for a group of resources is a statistical measure computed from a data set of measurements of the length of time that elapses between the time that users click on a search result included in a search results web page that identifies a resource in the group of resources and the time that the user navigates back to the search results web page. Optionally, in order to account for users that click on a search result and do not return to the search results web page, the duration measured for any given click is capped at a pre-determined maximum value. The predetermined maximum value can be, e.g., five minutes, ten minutes, twenty minutes, thirty minutes, or one hour.

The system obtains a value of a group-specific query metric for the group of resources (step 504). Generally, the group-specific query metric for a group of resources is a metric that measures the quality of the group of resources based in part on how many queries that reference the group of resources have been submitted to a search engine. A query that references the group of resources can be, for example, a query that specifies that search results generated in response to the query should identify only resources from the group of resources or from a subset of the group of resources. The group-specific query metric (GS) can be expressed as:

$$GS = \frac{\max(s-a, 0) \cdot b}{q^c},$$

where s is the number of queries that reference a resource in the group of resources, q is the number of unique queries for which a search result identifying a resource in the group of resources received a click, and a, b, and c are suitable constants. For example, the value of a may be a value between 5 and 30, e.g., 10, 15, or 20, the value of b may be a value between 500 and 2000, e.g., 750, 1000, or 1500, and the value of c may be a value between 0.65 and 0.95, e.g., 0.7, 0.8, or 0.9.

The system uses the average duration metric and the group-specific query metric values to determine the modification factor for the group (step 506). For example, the system can adjust the modification factor for the group determined using the deliberate visit fraction and the repeat click fraction based on a protection factor (PF) derived from the value of the average duration metric (AD) for the group and the value of the group-specific query metric (GS) for the group. The protection factor can be expressed as:

$$PF = S_{AD,GS}(AD, GS),$$

where $S_{AD,GS}$(AD,GS) is a surface sigmoid function that takes as input the values of the average duration metric and group-specific query metric and outputs a value in a range of zero to one, inclusive.

Then, the modification factor for the group of resources (M) can be expressed as $$M = M_{RCF,DVF} + PF,$$

so that the modification determined based on the repeat click-factor and the deliberate visit fraction is adjusted by the protection factor derived from the values of the average duration metric and the group-specific query metric.

Figure 6:
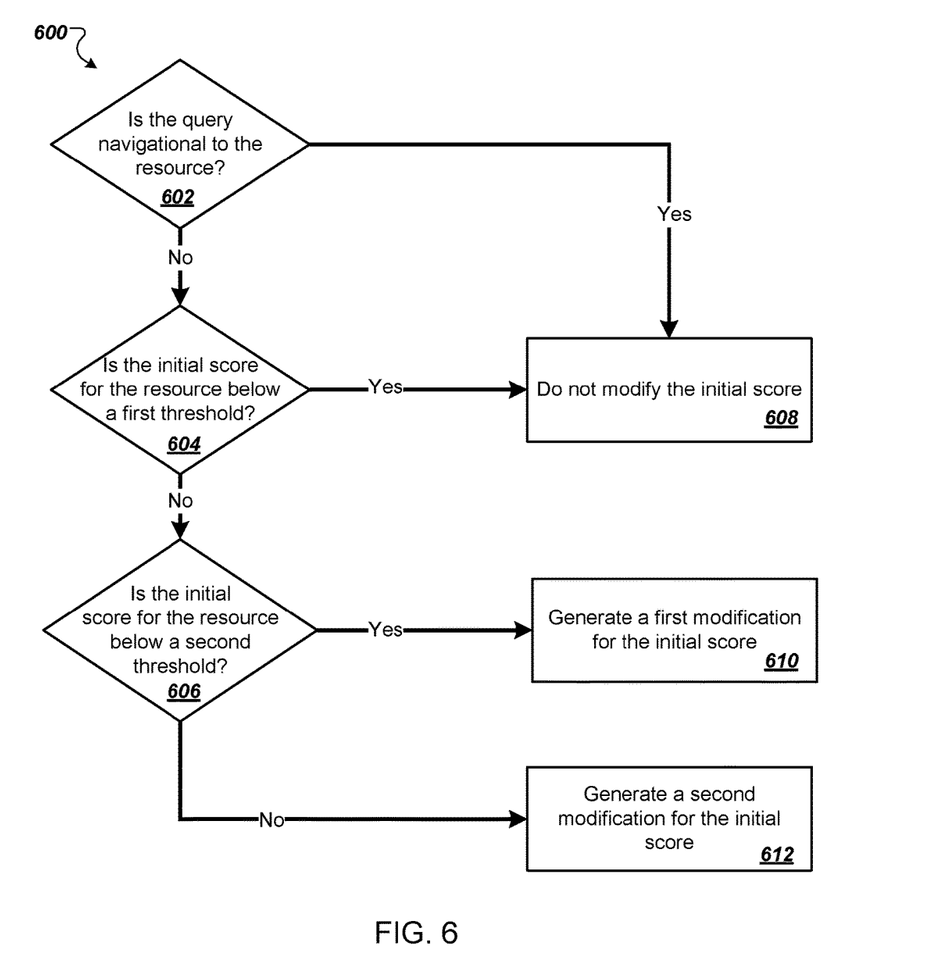
FIG. 6 is a flow diagram of an example process for generating a resource-specific modification factor for a resource.

FIG. 6 is a flow diagram of an example process for generating a resource-specific modification factor for a resource. For convenience, the process 600 will be described as being performed by a system of one or more computers located in one or more locations. For example, a search system, e.g., search system 114 of FIG. 1, can be used to perform the process 600.

The process 600 can be performed for each of a number of resources in response to a search query received from a user.

The system determines whether the received query is navigational to the resource (step 602). For example, the system can determine that a query is navigational to a resource if the query references the resource. A query can reference the resource if, e.g., the query includes a term referencing the resource locator of the resource, e.g., if the query includes all or part of the resource locator of the resource. For example, for the resource "www.examplesite.com," a received query "news event examplesite" may be considered to be navigational to the resource. The system can determine whether the received query is navigational to the resource by accessing data that characterizes the query as either navigational or not navigational to the resource.

If the received query is navigational to the resource, the system determines not to modify the initial score for the resource (step 608). That is, the system applies a modification factor to the initial score that does not alter the value of the initial score (e.g., if the modification factor is multiplicative, the system can set the value of the modification factor to one).

If the query is not navigational to the resource, the system determines whether the initial score for the resource is below a first threshold value (step 604). The initial score for the resource is generated by a search engine in response to the query and can be, e.g., a measure of the relevance of the resource to the search query. If the initial score for the resource is below the first threshold value, the system determines not to modify the initial score for the resource (step 608). For example, if the initial score for the resource is below the first threshold value, e.g., 0.65, it may not be desirable to modify the initial score because it is already low relative to the initial scores for other resources.

If the initial score for the resource is not below the first threshold value, the system determines whether the initial score is below a second, higher threshold value (step 606). If the initial score is below the second threshold, the system generates a first modification factor to be applied to the initial score (step 610). For example, if the modification factor is multiplicative, the first modification factor $f_1$ can be expressed as:

$$f_1 = \frac{T_1 + (IS - T_1) \cdot M}{IS},$$

where $T_1$ is the first threshold value, IS is the initial score, and M is the group-based modification factor for the group of resources to which the resource belongs. Thus, if the initial score for the resource is between the first and second threshold values, e.g., between 0.65 and 10, the system applies a modification factor that decreases as the initial score increases.

If the initial score is not below the second threshold value, the system generates a second modification factor to be applied to the initial score (step 612). The second modification factor can be computed based on the first modification factor. For example, if the modification factor is multiplicative, the second modification factor $f_2$ can be expressed as:

$$f_2 = \frac{f_1}{\log_{T_2}(IS) \cdot g(f_1)},$$

where $T_2$ is the second threshold value and $g(f)$ is a smoothing function that reduces the effect of the second modification factor on the initial score for particular ranges of values of the first modification factor. For example, the smoothing function can be defined so that, if the first modification factor exceeds a threshold value, the second modification factor, when applied to the initial score, has a muted effect or no effect on the value of the initial score. In some implementations, the smoothing function is defined as a piecewise function, so that:

$g(f_1)=1$, if $f_1 \leq Q$ and $$g(f_1) = \frac{(1 - f_1)}{1 - P},$$

if $f_1 > Q$,
where Q is a predetermined threshold value. In these implementations, if the value of $\log_{T_2}(IS) \cdot g(f_1)$ is less than one, e.g., if $f_1$ is equal to one and the product is therefore equal to zero, the system can set $f_2$ equal to $f_1$ to avoid the value of $f_2$ being greater than $f_1$ or the value of $f_2$ being undefined.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising one or more computers and one or more storage devices, the one or more storage devices storing instructions that, when executed by the one or more computers, cause the one or more computers to perform operations comprising:
receiving a search query from a client device;
receiving search result data identifying a first plurality of search result resources and respective initial scores for each of the first plurality of search result resources;
identifying a respective group of resources to which each of the search result resources belongs;
determining a respective group-based modification factor for each group of resources; and
adjusting the initial score for each of the search result resources based at least in part on the group-specific modification factor for the group of resources to which the search result resource belongs to generate a respective second score for each of the search result resources, wherein adjusting the initial score for each of the search result resources comprises:
determining that the search query is not a navigational search query, and
based on determining that the search query is not a navigational search query, (i) generating a respective resource-specific modification factor for each of the search result resources based on the group-based modification factors, and (ii) adjusting the initial score for each of the search result resources based on the respective resource-specific modification factor for each of the respective search result resources to generate the second score for each of the search result resources;
ordering the search results according to the second scores of the search result resources identified by the search results; and
providing the search results to the client device for presentation.

2. The system of claim 1, wherein adjusting the initial score for each of the search result resources based at least in part on the group-specific modification factor for the group of resources to which the search result resource belongs further comprises:
multiplying the initial score for the search result resource by the resource-specific modification factor for the search result resource.

3. The system of claim 2, wherein each search result resource in the first plurality of search result resources has an initial score that exceeds a first threshold value.

4. The system of claim 3, wherein generating a respective resource-specific modification factor for each of the search result resources in the first plurality of search result resources based on the group-based modification factors comprises:
if the initial score for the search result resource exceeds the first threshold value but does not exceed a second, higher threshold value, generating a resource-specific modification factor $f_1$ that satisfies:

$$f_1 = \frac{T_1 + (IS - T_1) \cdot M}{IS},$$

wherein $T_1$ is the first threshold value, IS is the initial score for the search result resource, and M is the group-based modification factor for the group of resources to which the search result resource belongs; and
if the initial score for the search result resource exceeds the second threshold value, generating a resource-specific modification factor $f_2$ that satisfies:

$$f_2 = \frac{f_1}{\log_{T_2}(IS) \cdot g(f_1)},$$

wherein $T_2$ is the second threshold value and $g(f_1)$ is a smoothing function that reduces the effect of the resource-specific modification factor for the search result resource on the initial score for the search result resource for particular ranges of values of the initial resource-specific modification factor.

5. The system of claim 2, wherein the smoothing function satisfies:

$$g(f_1)=1, \text{ if } f_3 \leq Q \text{ and}$$

$$g(f_1) = \frac{(1 - f_1)}{1 - P},$$

if $f_3 > Q$,
wherein Q is a predetermined threshold value.

6. A computer-implemented method comprising:
receiving a search query from a client device;
receiving search result data identifying a first plurality of search result resources and respective initial scores for each of the first plurality of search result resources;
identifying a respective group of resources to which each of the search result resources belongs;
determining a respective group-based modification factor for each group of resources; and
adjusting the initial score for each of the search result resources based at least in part on the group-specific modification factor for the group of resources to which the search result resource belongs to generate a respective second score for each of the search result resources,
wherein adjusting the initial score for each of the search result resources comprises:
determining that the search query is not a navigational search query, and
based on determining that the search query is not a navigational search query,
(i) generating a respective resource-specific modification factor for each of the search result
resources based on the group-based modification factors, and
(ii) adjusting the initial score for each of the search result resources based on the respective resource-specific modification factor for each of the respective search result resources to generate the second score for each of the search result resources;
ordering the search results according to the second scores of the search result resources identified by the search results; and
providing the search results to the client device for presentation.

7. The method of claim 6, wherein adjusting the initial score for each of the search result resources based at least in part on the group-specific modification factor for the group of resources to which the search result resource belongs further comprises:

multiplying the initial score for the search result resource by the resource-specific modification factor for the search result resource.

8. The method of claim 7, wherein each search result resource in the first plurality of search result resources has an initial score that exceeds a first threshold value.

9. The method of claim 8, wherein generating a respective resource-specific modification factor for each of the search result resources in the first plurality of search result resources based on the group-based modification factors comprises:

if the initial score for the search result resource exceeds the first threshold value but does not exceed a second, higher threshold value, generating a resource-specific modification factor $f_1$ that satisfies:

$$f_1 = \frac{T_1 + (IS - T_1) \cdot M}{IS},$$

wherein $T_1$ is the first threshold value, IS is the initial score for the search result resource, and M is the group-based modification factor for the group of resources to which the search result resource belongs; and if the initial score for the search result resource exceeds the second threshold value, generating a resource-specific modification factor $f_2$ that satisfies:

$$f_2 = \frac{f_1}{\log_{T_2}(IS) \cdot g(f_1)},$$

wherein $T_2$ is the second threshold value and $g(f_1)$ is a smoothing function that reduces the effect of the resource-specific modification factor for the search result resource on the initial score for the search result resource for particular ranges of values of the initial resource-specific modification factor.

10. The method of claim 7, wherein the smoothing function satisfies:

$g(f_1)=1$, if $f_3 \leq Q$ and $$g(f_1) = \frac{(1 - f_1)}{1 - P},$$

if $f_3 > Q$,
wherein Q is a predetermined threshold value.

11. A non-transitory computer-readable medium storing software comprising instructions executable by one or more computers which, upon such execution, cause the one or more computers to perform operations comprising:

receiving a search query from a client device;
receiving search result data identifying a first plurality of search result resources and respective initial scores for each of the first plurality of search result resources;
identifying a respective group of resources to which each of the search result resources belongs;
determining a respective group-based modification factor for each group of resources; and
adjusting the initial score for each of the search result resources based at least in part on the group-specific modification factor for the group of resources to which the search result resource belongs to generate a respective second score for each of the search result resources, wherein adjusting the initial score for each of the search result resources comprises:

determining that the search query is not a navigational search query, and
based on determining that the search query is not a navigational search query, (i) generating a respective resource-specific modification factor for each of the search result resources based on the group-based modification factors, and (ii) adjusting the initial score for each of the search result resources based on the respective resource-specific modification factor for each of the respective search result resources to generate the second score for each of the search result resources;

ordering the search results according to the second scores of the search result resources identified by the search results; and
providing the search results to the client device for presentation.

12. The computer-readable medium of claim 11, wherein adjusting the initial score for each of the search result resources based at least in part on the group-specific modification factor for the group of resources to which the search result resource belongs further comprises:

multiplying the initial score for the search result resource by the resource-specific modification factor for the search result resource.

13. The computer-readable medium of claim 12, wherein each search result resource in the first plurality of search result resources has an initial score that exceeds a first threshold value.

14. The computer-readable medium of claim 13, wherein generating a respective resource-specific modification factor for each of the search result resources in the first plurality of search result resources based on the group-based modification factors comprises:

if the initial score for the search result resource exceeds the first threshold value but does not exceed a second, higher threshold value, generating a resource-specific modification factor $f_1$ that satisfies:

$$f_1 = \frac{T_1 + (IS - T_1) \cdot M}{IS},$$

wherein $T_1$ is the first threshold value, IS is the initial score for the search result resource, and M is the group-based modification factor for the group of resources to which the search result resource belongs; and if the initial score for the search result resource exceeds the second threshold value, generating a resource-specific modification factor $f_2$ that satisfies:

$$f_2 = \frac{f_1}{\log_{T_2}(IS) \cdot g(f_1)},$$

wherein $T_2$ is the second threshold value and $g(f_1)$ is a smoothing function that reduces the effect of the resource-specific modification factor for the search result resource on the initial score for the search result resource for particular ranges of values of the initial resource-specific modification factor.

15. The computer-readable medium of claim 12, wherein the smoothing function satisfies:

$g(f_1)=1$, if $f_3 \leq Q$ and $$g(f_1) = \frac{(1 - f_1)}{1 - P},$$

if $f_3 > Q$,
wherein Q is a predetermined threshold value.

* * * * *